United States Patent
Kim et al.

(10) Patent No.: US 10,012,493 B2
(45) Date of Patent: Jul. 3, 2018

(54) DEVICE AND METHOD FOR DETECTING POSITION OF OBJECT

(71) Applicant: Samsung Electronics Co., Ltd., Suwon-si (KR)

(72) Inventors: Jung Woo Kim, Hwaseong-si (KR); Joon Ah Park, Seoul (KR); Kyoung Seok Pyun, Seoul (KR); Jung Soon Shin, Yongin-si (KR); Hong-Seok Lee, Seongnam-si (KR); Tae Sung Jung, Seoul (KR); Baek Hwan Cho, Seoul (KR); Seung Hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/728,391

(22) Filed: Jun. 2, 2015

(65) Prior Publication Data

US 2016/0123721 A1    May 5, 2016

(30) Foreign Application Priority Data

Oct. 31, 2014 (KR) .................. 10-2014-0150467

(51) Int. Cl.
G01B 11/00 (2006.01)
(52) U.S. Cl.
CPC .................. *G01B 11/002* (2013.01)
(58) Field of Classification Search
CPC .................................................. G01B 11/002
USPC .......................................................... 356/614
See application file for complete search history.

(56) References Cited

U.S. PATENT DOCUMENTS

| | | | | |
|---|---|---|---|---|
| 4,632,509 A * | 12/1986 | Ohmi | ...................... | B60R 1/088 349/116 |
| 5,576,562 A * | 11/1996 | Konuma | ........... | H01L 27/14831 257/221 |
| 6,326,956 B1 * | 12/2001 | Jaeger | ................... | G06F 3/0317 178/19.05 |
| 7,684,053 B2 * | 3/2010 | Chow | .................. | G01B 11/026 356/602 |
| 8,134,718 B2 * | 3/2012 | Miki | .................... | G01B 11/306 356/614 |
| 2005/0002042 A1* | 1/2005 | Schick | ................. | G01B 11/026 356/614 |
| 2005/0213109 A1* | 9/2005 | Schell | ..................... | G01S 5/163 356/614 |
| 2005/0259267 A1* | 11/2005 | Carlisle | ..................... | G01P 3/36 356/498 |

(Continued)

FOREIGN PATENT DOCUMENTS

| | | |
|---|---|---|
| JP | 10-027895 A | 1/1998 |
| JP | 11-337405 A | 12/1999 |

(Continued)

*Primary Examiner* — Tarifur Chowdhury
*Assistant Examiner* — Omar Nixon
(74) *Attorney, Agent, or Firm* — NSIP Law

(57) ABSTRACT

An electronic device for detecting a position of an object is disclosed, The electronic device includes an optical source configured to emit light to a detection area, a light concentrator configured to concentrate light reflected by a target object located in a detection area, a light receiver configured to receive through photodiodes the reflected light concentrated by the light concentrator and to output a light quantity pattern of the reflected light, and a processor configured to determine the position of the target object based on the light quantity pattern of the reflected light.

16 Claims, 13 Drawing Sheets

(56) References Cited

U.S. PATENT DOCUMENTS

| | | | |
|---|---|---|---|
| 2007/0044536 A1* | 3/2007 | Gunsaulis | E21B 7/04 73/1.79 |
| 2007/0267098 A1* | 11/2007 | Ozanne | B67D 1/1238 141/198 |
| 2008/0137071 A1* | 6/2008 | Chow | G01B 11/24 356/73 |
| 2009/0310147 A1* | 12/2009 | Miki | G01B 11/306 356/624 |
| 2011/0019205 A1* | 1/2011 | Gerber | G06K 9/00355 356/615 |
| 2011/0141486 A1* | 6/2011 | Wada | G06F 3/011 356/614 |
| 2012/0032193 A1* | 2/2012 | Kurokawa | H01L 27/14632 257/84 |
| 2012/0075622 A1* | 3/2012 | Nagura | G01D 5/3473 356/138 |
| 2013/0308073 A1* | 11/2013 | Yamazaki | H01L 27/323 349/46 |
| 2013/0328761 A1 | 12/2013 | Boulanger et al. | |
| 2013/0335225 A1 | 12/2013 | Wen | |
| 2014/0027606 A1 | 1/2014 | Raynor et al. | |
| 2014/0085245 A1* | 3/2014 | Baldwin | G06F 3/042 345/174 |
| 2014/0267620 A1* | 9/2014 | Bridges | G01S 17/003 348/46 |
| 2014/0285818 A1* | 9/2014 | Holz | G01S 17/42 356/614 |

FOREIGN PATENT DOCUMENTS

| | | |
|---|---|---|
| JP | 2000-258244 A | 9/2000 |
| JP | 2000-286403 A | 10/2000 |
| JP | 2001-244494 A | 9/2001 |
| JP | 2007-235509 A | 9/2007 |
| JP | 2012-242694 A | 12/2012 |
| JP | 2013-122410 A | 6/2013 |
| KR | 10-2014-0022404 A | 2/2014 |
| KR | 10-2014-0056986 A | 5/2014 |

* cited by examiner

FIG. 4

| IDENTIFICATION INFORMATION | INCIDENCE ANGLE |
|---|---|
| $PD_1$ | 50° |
| $PD_2$ | 55° |
| $PD_3$ | 60° |
| ⋮ | ⋮ |
| $PD_n$ | 130° |

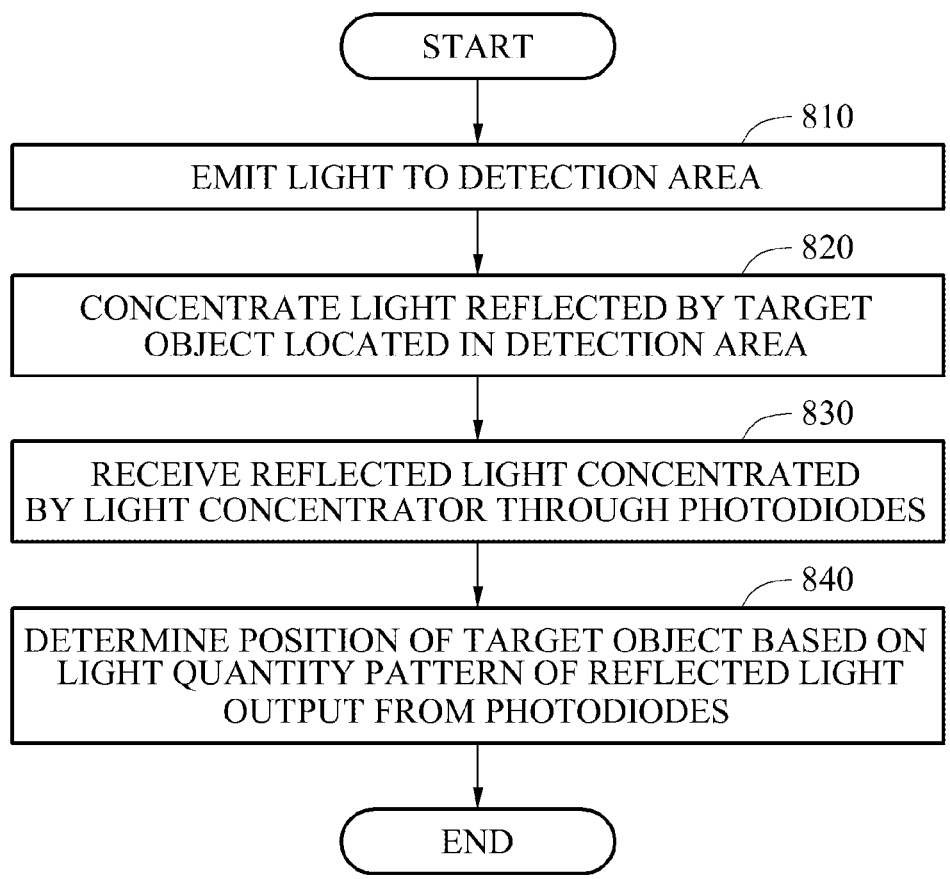

DEVICE AND METHOD FOR DETECTING POSITION OF OBJECT

CROSS-REFERENCE TO RELATED APPLICATION

This application claims the benefit under 35 USC 119(a) of Korean Patent Application No. 10-2014-0150467, filed on Oct. 31, 2014, in the Korean Intellectual Property Office, the entire disclosure of which is incorporated herein by reference for all purposes.

BACKGROUND

1. Field

The following description relates to a device for detecting a position of an object.

2. Description of Related Art

Various input methods have been developed in line with the development of electronic devices. For example, one input method relates to recognizing a gesture performed by a user. A conventional gesture recognizing method may use an image sensor, an ultrasonic sensor, and an acceleration sensor. However, the conventional gesture recognizing device is not compact in size or energy efficient.

The gesture recognizing method using the image sensor may require an operation to process an image or measure an amount of time for emitted light to return after reflection. Using the ultrasonic sensor may be restricted in various application fields due to a size and an environment in which the ultrasonic sensor is used. Further, using the acceleration sensor may not be suitable for non-contact gesture recognizing technology. Accordingly, there is a desire for a device for recognizing a gesture or an action that may be small in size and operate with low power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an electronic device including an optical source configured to emit light to a detection area, a light concentrator configured to concentrate light reflected by a target object located in the detection area, a light receiver configured to receive through photodiodes the reflected light concentrated by the light concentrator and to output a light quantity pattern of the reflected light, and a processor configured to determine a position of the target object based on the light quantity pattern of the reflected light.

The processor may determine a position of a photodiode with respect to the electronic device based on the light quantity pattern which indicates a maximum quantity of light detected among the photodiodes, and to determine the position of the target object with respect to the electronic device based on the position of the photodiode.

The processor may determine a distance between the light concentrator and the target object based on an incidence angle of the reflected light on the light concentrator.

The processor may determine the incidence angle of the reflected light on the light concentrator based on mapping information between the photodiodes and the incidence angle of the reflected light.

The processor may determine, to be the incidence angle of the reflected light, an incidence angle mapped to a photodiode receiving a maximum quantity of the reflected light among the photodiodes.

The light concentrator may include a first light concentrator configured to concentrate first reflected light of the light reflected by the target object, and a second light concentrator configured to concentrate second reflected light of the light reflected by the target object. The light receiver may include a first light receiver configured to receive the first reflected light concentrated by the first light concentrator, and a second light receiver configured to receive the second reflected light concentrated by the second light concentrator.

The processor may determine a distance between the light concentrator and the target object based on an incidence angle of the first reflected light, an incidence angle of the second reflected light, and a distance between the first light concentrator and the second light concentrator.

The processor may determine, to be the distance between the light concentrator and the target object, a height of a triangle having the distance between the first light concentrator and the second light concentrator as a base line, the incidence angle of the first reflected light as an exterior angle of the base line, and the incidence angle of the second reflected light as an interior angle of the base line.

The processor may determine the position of the target object based on first mapping information comprising identification information of photodiodes included in the first light receiver and corresponding incidence angles of the first reflected light, and on second mapping information comprising identification information of photodiodes included in the second light receiver and corresponding incidence angles of the second reflected light.

In another general aspect, there is provided an operating method of an electronic device, including emitting light to a detection area, concentrating light reflected by a target object located in the detection area, receiving through photodiodes the reflected light concentrated by a light concentrator and outputting a light quantity pattern of the reflected light, and determining a position of the target object based on the light quantity pattern of the reflected light.

The determining of the position of the target object may include determining a distance between the light concentrator and the target object based on an incidence angle of the reflected light on the light concentrator.

The determining of the position of the target object may include determining the incidence angle of the reflected light on the light concentrator based on mapping information between the photodiodes and the incidence angle of the reflected light on the light concentrator.

The determining of the distance between the light concentrator and the target object may include determining, to be the incidence angle of the reflected light on the light concentrator, an incidence angle mapped to a photodiode receiving a maximum quantity of the reflected light among the photodiodes.

The determining of the position of the target object may include determining the distance between the light concentrator and the target object based on a distance between a first light concentrator and a second light concentrator included in the light concentrator.

In still another general aspect, there is provided a position measuring sensor including a light concentrator configured to concentrate light reflected by a target object located in a detection area, and a light receiver configured to receive the reflected light from the light concentrator through photodiodes. A position of the target object may be determined based on a light quantity pattern which represents a pattern of a quantity of the reflected light received by each of the photodiodes.

The photodiodes may be disposed at respective positions mapped to various incidence angles of the reflected light with respect to the light concentrator.

The photodiodes may be disposed along concentric circles to form a circular formation.

The photodiodes may be disposed along lines having a single intersection point.

Other features and aspects will be apparent from the following detailed description, the drawings, and the claims.

BRIEF DESCRIPTION OF THE DRAWINGS

FIG. 4 is a diagram illustrating an example of mapping information between photodiodes and corresponding incidence angles.

FIG. 8 is a flowchart illustrating an example of an operating method of an electronic device to recognize a position of an object.

Figure 1:
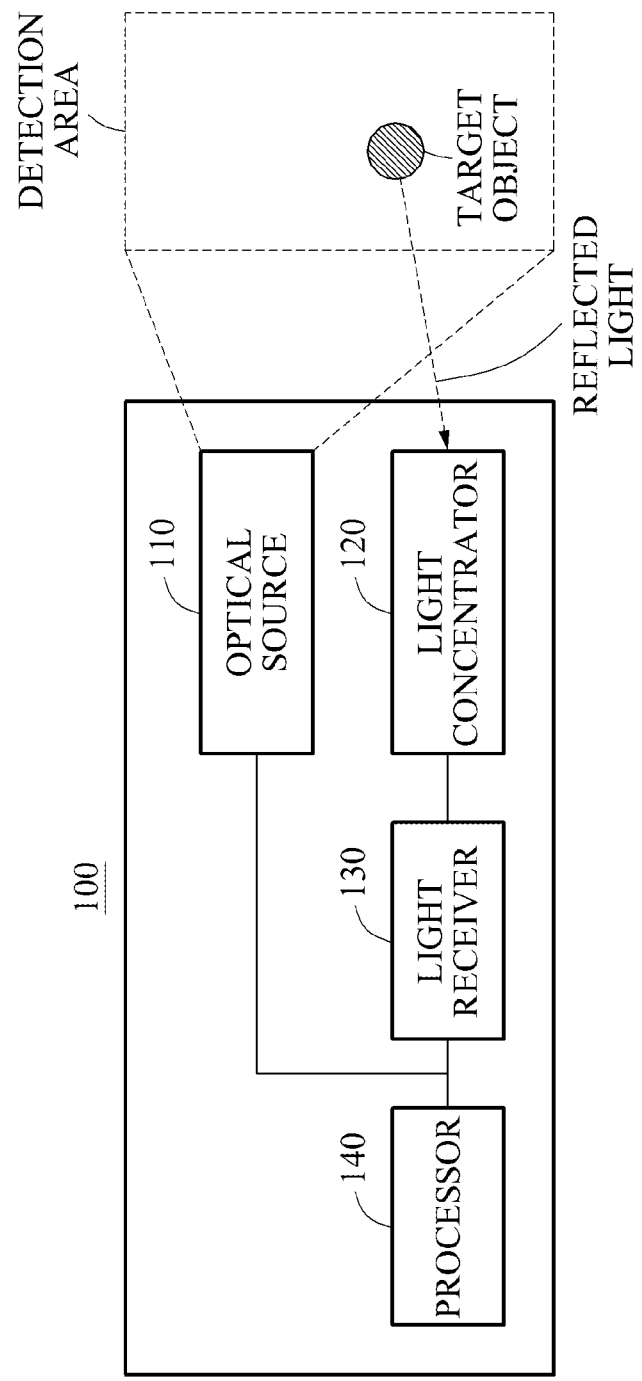
FIG. 1 is a diagram illustrating an example of an electronic device to recognize a position of an object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an example of an electronic device to recognize a position of an object.

Referring to FIG. 1, the electronic device 100 includes an optical source 110, a light concentrator 120, a light receiver 130, and a processor 140.

The electronic device 100 measures a position of a target object located in a detection area using the optical source 110, the light concentrator 120, the light receiver 130, and the processor 140. In addition, the electronic device 100 measures a movement of the target object by tracking a change in the position of the target object. The target object may be, for example, a hand or a finger of an individual or a stylus pen for non-contact input into the electronic device 100.

The electronic device 100 measures the position of the target object and a distance between the electronic device 100 and the target object. The distance between the electronic device 100 and the target object may indicate a depth. The electronic device 100 measures the position of the target object and the depth based on a quantity of reflected light to be output from the light receiver 130. In addition, the electronic device 100 measures an accurate depth of the target object based on an incidence angle of the light reflected from the target object. Hereinafter, a configuration and an operation of the electronic device 100 will be described in detail.

The optical source 110 emits light to the detection area. The optical source 110 may be disposed on the electronic device 100 and configured to emit the light to the detection area. The optical source 110 may be for example, a light-emitting diode (LED) based source, a laser diode (LD) based source, a laser, an incandescent source such as a filament lamp and a halogen lamp, and a fluorescent source. The LED based source may be an infrared LED, an ultraviolet LED, a red LED, a blue LED, a green LED, a yellow LED, an amber LED, an orange LED, and a white LED. More suitably, the optical source 110 may be the infrared LED or an infrared LD.

The light concentrator 120 concentrates light reflected by the target object located in the detection area. The light concentrator 120 may include a condensing lens or a pinhole to concentrate the light reflected by the object or reflected light. At least two light concentrators may be autonomously present as the light concentrator 120.

The light receiver 130 receives the reflected light concentrated by the light concentrator 120 through photodiodes.

At least two light receivers may be autonomously present as the light receiver 130 depending on the number of the light concentrators. Accordingly, in an example, a number of light receivers 130 may be the same as a number of light concentrators 120. When light receivers are present as the light receiver 130, each of the light receivers may receive the reflected light from the light concentrators. The photodiodes included in the light receiver 130 may output a light quantity pattern of the received reflected light. The light quantity pattern may indicate an overall pattern of a quantity of the reflected light received by each of the photodiodes.

The processor 140 determines the position of the target object based on the light quantity pattern output from the photodiodes included in the light receiver 130. The light quantity pattern will be further described with reference to FIGS. 2A through 2C.

Figure 2A:
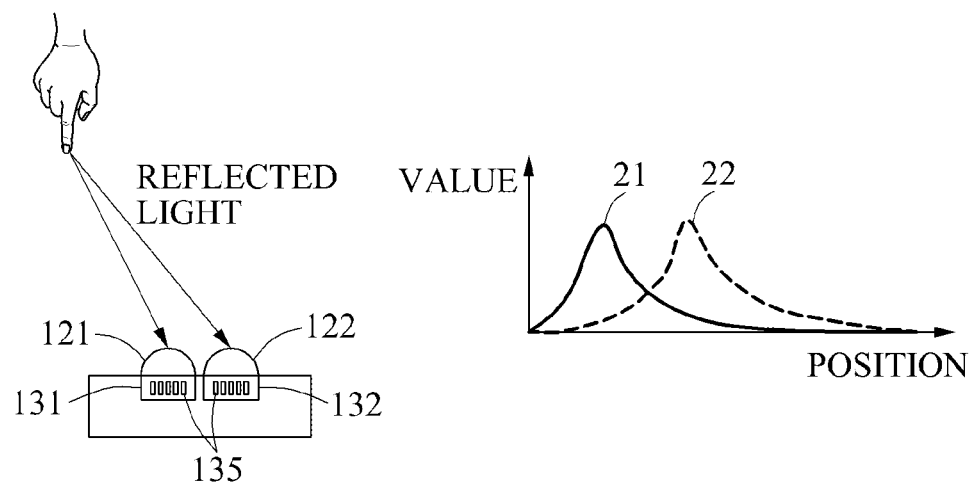
FIGS. 2A through 2C are diagrams illustrating examples of a light quantity pattern based on a position of an object.
Figure 2B:
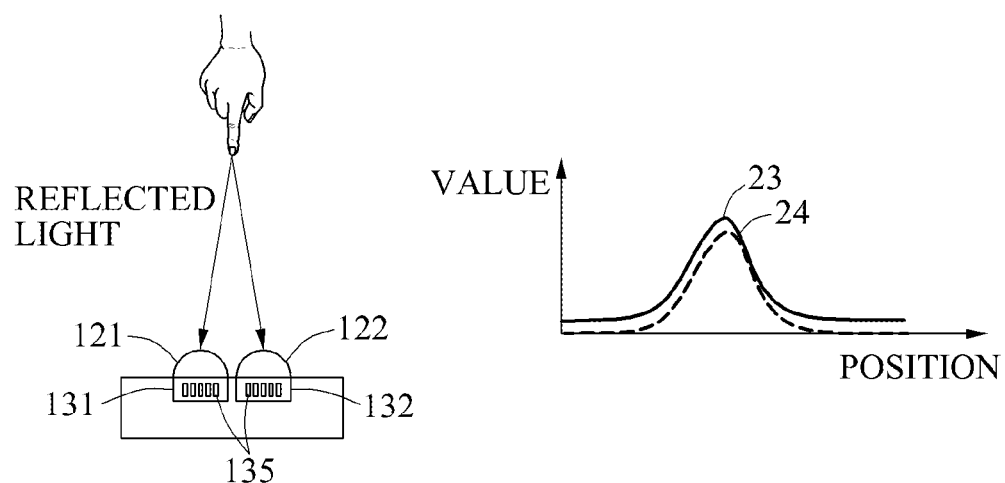
Figure 2C:
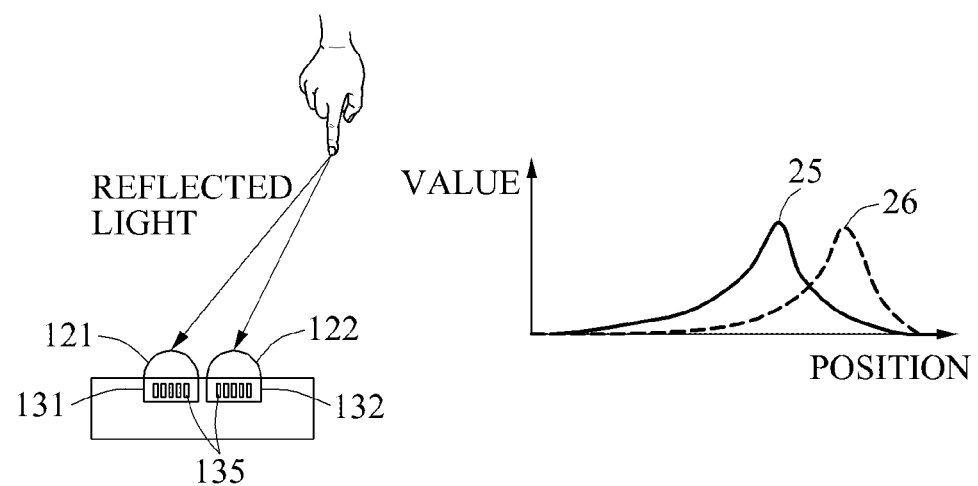

FIGS. 2A through 2C are diagrams illustrating examples of a light quantity pattern based on a position of an object.

FIG. 2A illustrates an example of a target object present at a left side of the electronic device. FIG. 2B illustrates an example of a target object present at a center of the electronic device. FIG. 2C illustrates an example of a target object present on a right side of the electronic device. In each example, a first light concentrator 121, a second light concentrator 122, a first light receiver 131, and a second light receiver 132 are used. Each of the first light receiver 131 and the second light receiver 132 includes photodiodes 135. It is noted that although FIGS. 2A through 2C, each illustrate two light concentrators 121, 122, two light receivers 131, 132, and diodes 135, the examples are not limited thereto and thus more or less elements may be included in the examples.

FIG. 2A also illustrates a light quantity pattern 21 and a light quantity pattern 22 corresponding to the example of the target object present at the left side of the electronic device. Referring to FIG. 2A, the light quantity pattern 21 is output from the first light receiver 131, and the light quantity pattern 22 is output from the second light receiver 132. As illustrated in FIG. 2A, the light quantity pattern 21 is closer to a left side in comparison to the light quantity pattern 22. An incidence angle of reflected light to be received by the first light receiver 131 may differ from an incidence angle of reflected light to be received by the second light receiver 132.

FIG. 2B also illustrates a light quantity pattern 23 and a light quantity pattern 24 corresponding to the example of the target object present at the center of the electronic device. Referring to FIG. 2B, the light quantity pattern 23 is output from the first light receiver 131, and the light quantity pattern 24 is output from the second light receiver 132. As illustrated in FIG. 2B, the light quantity pattern 23 and the light quantity pattern 24 have a similar form.

FIG. 2C also illustrates a light quantity pattern 25 and a light quantity pattern 26 corresponding to the example of the target object present at the right side of the electronic device. Referring to FIG. 2C, the light quantity pattern 25 is output from the first light receiver 131, and the light quantity pattern 26 is output from the second light receiver 132. As illustrated in FIG. 2C, the light quantity pattern 26 is closer to a right side in comparison to the light quantity pattern 25.

The processor 140 of FIG. 1 may determine a position of the target object with respect to the electronic device 100 using a photodiode in which a maximum quantity of light is detected based on a light quantity pattern. For example, the processor 140 may determine the position of the target object with respect to the electronic device 100 by comparing a position of a photodiode in which a maximum quantity of light is detected based on the light quantity pattern 21 to a position of a photodiode in which a maximum quantity of light is detected based on the light quantity pattern 22.

The processor 140 may determine that the target object is present on the left side of the electronic device 100 of FIG. 1 based on a fact that the positions of the photodiodes in which the maximum quantities of light are detected based on the light quantity pattern 21 and the light quantity pattern 22 are close to the left side of the electronic device. In addition, the processor 140 may determine a degree of closeness of the target object to the left side of the electronic device 100 based on a difference between the position of the photodiode in which the maximum quantity of light is detected based on the light quantity pattern 21 and the position of the photodiode in which the maximum quantity of light is detected based on the light quantity pattern 22.

Similarly, the processor 140 may determine that the target object is present at the center of the electronic device, as illustrated in FIG. 2B, or the right side of the electronic device 100, as illustrated in FIG. 2C, based on a position of a photodiode in which a maximum quantity of light is detected based on a light quantity pattern. In addition, the processor 140 may determine a depth of the target with respect to the electronic device based on a value of a light quantity, which is an intensity of reflected light. The depth of the target with respect to the electronic device may indicate a distance between the electronic device 100 and the target object.

Referring back to FIG. 1, the processor 140 may determine a distance between the light concentrator 120 and the target object based on an incidence angle of the reflected light. The depth may be more accurately measured using the incidence angle of the reflected light than using the intensity of the reflected light. The measuring of the depth using the incidence angle will be further described with reference to FIGS. 3 through 6.

Figure 3:
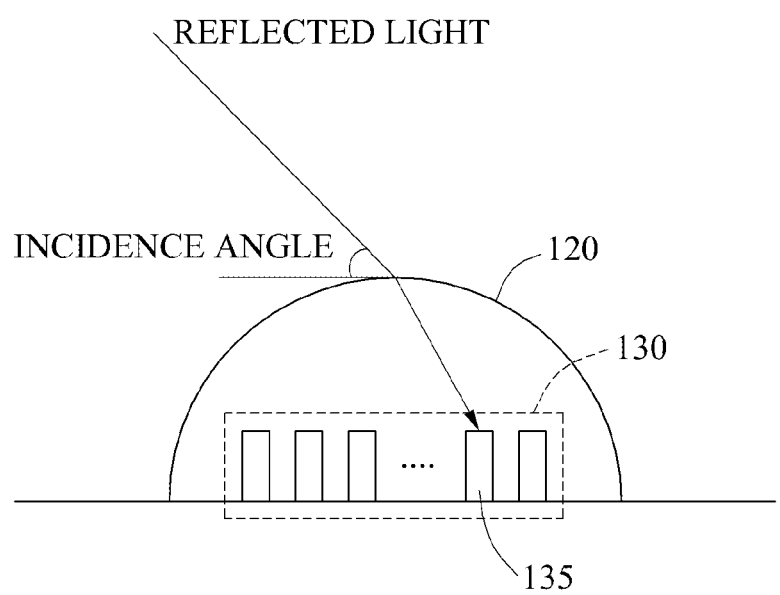
FIG. 3 is a diagram illustrating an example of an incidence angle.

FIG. 3 is a diagram illustrating an example of an incidence angle.

FIG. 3 illustrates the light concentrator 120 of FIG. 1, reflected light emitted to the light concentrator 120, an incidence angle of the reflected light, the light receiver 130 of FIG. 1, and the photodiodes 135 included in the light receiver 130.

The incidence angle may indicate an angle to be formed between the reflected light and a horizontal line based on an incident point to which the reflected light is incident. The incident point may be, for example, located at a center of the light concentrator 120. Alternatively, the incident point may vary depending on an incident direction of the reflected light.

The photodiodes 135 may be mapped to various incidence angles. The photodiodes 135 may be disposed at respective positions mapped to corresponding incidence angles of the reflected light. For example, a first photodiode of the photodiodes 135 may be mapped to an incidence angle of 70 degrees (°), and a second photodiode of the photodiodes 135 may be mapped to an incidence angle of 80°. That is, when the reflected light is emitted to the first photodiode, the incidence angle of the reflected light may be determined to be 70°. Similarly, when the reflected light is emitted to the second photodiode, the incidence angle of the reflected light may be determined to be 80°.

The processor 140 may determine the incidence angle of the reflected light based on mapping information to which the photodiodes 135 and the incidence angle of the reflected light are mapped. An example of the mapping information will be provided with reference to FIG. 4.

FIG. 4 is a diagram illustrating an example of mapping information between photodiodes and corresponding incidence angles.

FIG. 4 illustrates identification information regarding photodiodes and incidence angles mapped to the photodiodes. Referring to FIG. 4, a first photodiode ($PD_1$) of n photodiodes is mapped to an incidence angle of 50°, and an n-th photodiode ($PD_n$) is mapped to an incidence angle of 130°.

When reflected light is detected in a third photodiode ($PD_3$), the processor 140 of FIG. 1 may determine an incidence angle of the reflected light to be 60° based on the mapping information. When the reflected light is detected in photodiodes, the processor 140 may determine, to be the incidence angle of the reflected light, an incidence angle mapped to a photodiode receiving a relatively large quantity of the reflected light among the photodiodes in which the reflected light is detected.

The mapping information illustrated in FIG. 4 is provided only as an illustrative example and is not limited thereto. Thus, the mapping information may vary depending on the number of the photodiodes, a size of a photodiode, a spacing between the photodiodes, and a form of the light concentrator 120 of FIG. 1.

Figure 5:
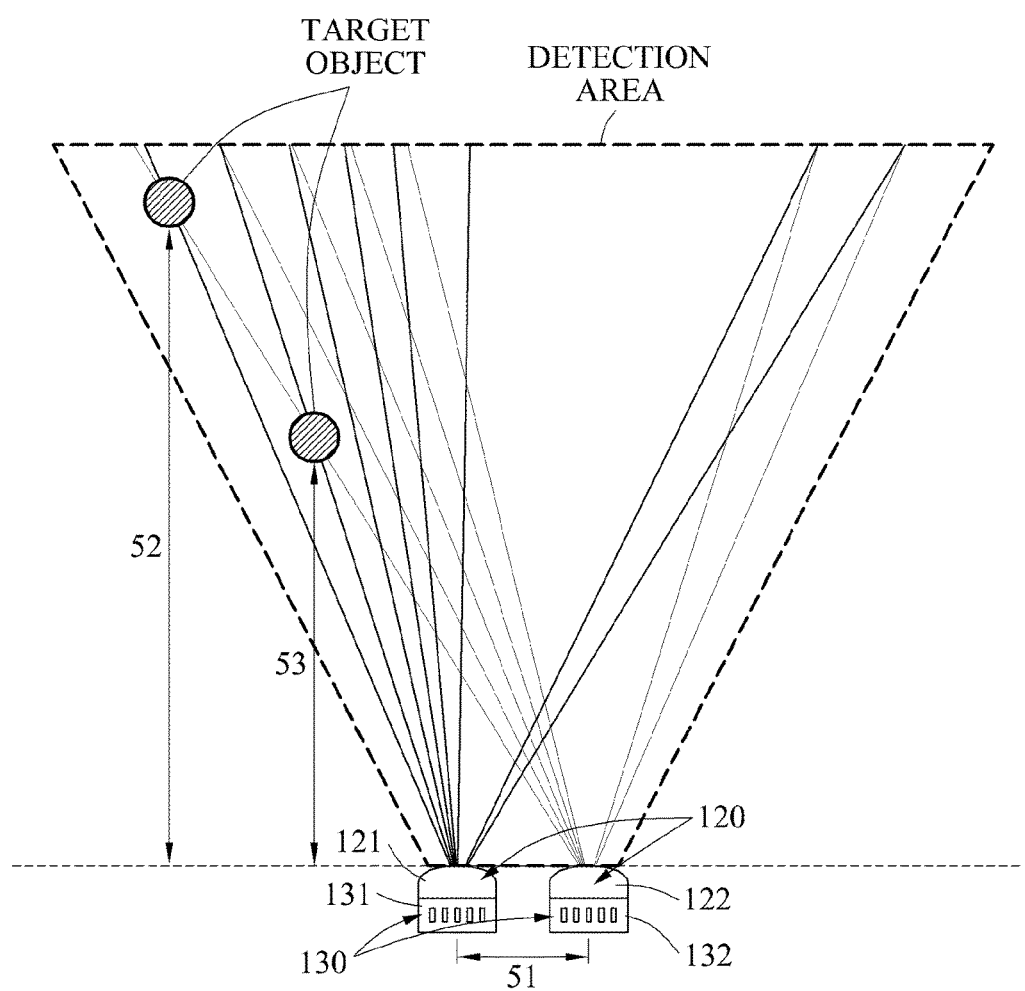
FIG. 5 is a diagram illustrating an example of a method of measuring a distance between a light concentrator and a target object using incidence angles.

FIG. 5 is a diagram illustrating an example of a method of measuring a distance between the light concentrator of FIG. 1 and a target object using incidence angles.

FIG. 5 illustrates various incidence angles of reflected light, the light concentrator 120 including a first light concentrator 121 and a second light concentrator 122, and the light receiver 130 of FIG. 1 including a first light receiver 131 and a second light receiver 132.

The reflected light may be incident at various angles based on a position of the target object. The reflected light may be incident at different angles to the first light concentrator 121 and the second light concentrator 122. First reflected light concentrated by the first light concentrator 121 may be received by the first light receiver 131. Similarly, second reflected light concentrated by the second light concentrator 122 may be received by the second light receiver 132.

First mapping information may include mapping information between the photodiodes included in the first light receiver 131 and an incidence angle of the first reflected light. Second mapping information may include information between photodiodes included in the second light receiver 132 and an incidence angle of the second reflected light. The processor 140 of FIG. 1 may detect the incidence angle of the first reflected light based on the first mapping information, and the incidence angle of the second reflected light based on the second mapping information.

The processor 140 may determine a depth, for example, a depth 52 and a depth 53, of the target object based on a distance 51 between the first light concentrator 121 and the second light concentrator 122 along with the incidence angle of the first reflected light and the incidence angle of the second reflected light. The depth 52 and the depth 53 may indicate a distance between the light concentrator 120 and the target object. The distance 51 between the first light concentrator 121 and the second light concentrator 122 may indicate a distance between a center of the first light concentrator 121 and a center of the second light concentrator 122, which also indicates a distance between incident points but is not limited thereto. That is, the distance 51 may also be between any two points between the first light concentrator 121 and the second light concentrator 122. A method of calculating the depth 52 and the depth 53 of the target object will be described in detail with reference to FIG. 6.

Figure 6:
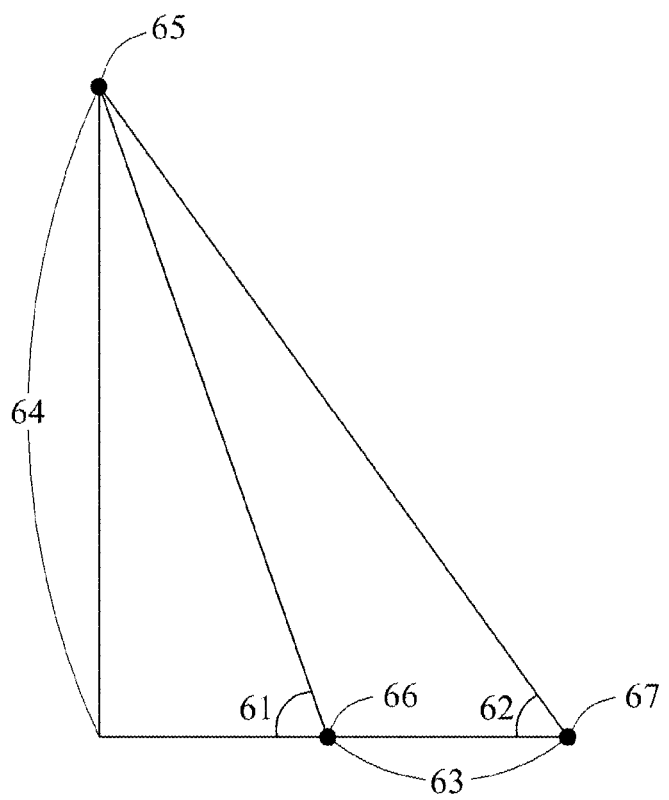
FIG. 6 is a diagram illustrating an example of a method of calculating a distance between a light concentrator and a target object.

FIG. 6 is a diagram illustrating an example of a method of calculating a distance between a light concentrator and a target object.

FIG. 6 illustrates an incidence angle 61 of first reflected light, an incidence angle 62 of second reflected light, a first incident point 66, a second incident point 67, a distance 63 between the first incident point 66 and the second incident point 67, a depth 64 of the target object, and a position 65 of the target object.

The processor 140 of FIG. 1 may calculate the depth 64 of the target object 65 from the light concentrator based on the incidence angle 61 of the first reflected light, the incidence angle 62 of the second reflected light, and the distance 63 between the first incident point 66 and the second incident point 67. The processor 140 may calculate the depth 64 of the target object 65 from the light concentrator using a trigonometric function. For example, the processor 140 may calculate the depth 64 of the target object 65 from the light concentrator using Equation 1.

$$h = \frac{\sin A \sin B}{\sin(B-A)} d = \frac{\tan A \tan B}{\tan B - \tan A} d \qquad \text{Equation 1}$$

In Equation 1, "h" denotes the depth 64 of the target object. "B" and "A" denote the incidence angle 61 of the first reflected light and the incidence angle 62 of the second reflected light, respectively. "d" denotes the distance 63 between the incident point 66 and the incident point 67.

FIGS. 7A through 7D are diagrams illustrating examples of a disposition of photodiodes.

The photodiodes 135 may be disposed to form example formations illustrated in FIGS. 7A through 7D. However, it is noted that the formations of the photodiodes 135 are not limited to those illustrated in FIGS. 7A through 7D and the photodiodes 135 may be formed in various other patterns.

Figure 7A:
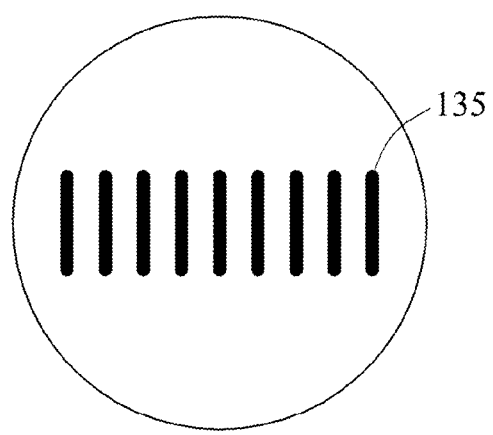
FIGS. 7A through 7D are diagrams illustrating examples of a disposition of photodiodes.

Referring to FIG. 7A, the photodiodes 135 are disposed in a line. When the photodiodes 135 are disposed in the line, a position of a target object with respect to a direction toward which the photodiodes 135 are disposed and a depth of the target object with respect to a vertical direction from the direction toward which the photodiodes 135 are disposed may be accurately measured.

Figure 7B:
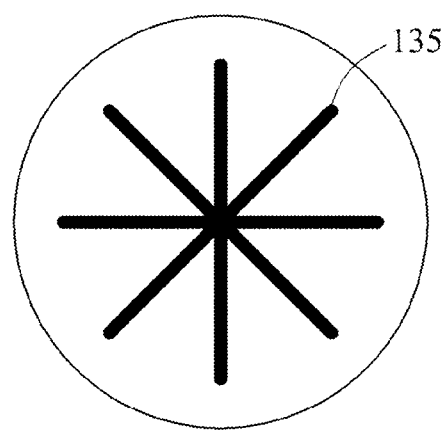

Referring to FIG. 7B, the photodiodes 135 are disposed along lines having a single intersection point. When the photodiodes 135 are disposed along the lines having the single intersection point, a position of a target object with respect to all directions and a depth of the target object with respect to a vertical direction from all directions may be accurately measured.

Figure 7C:
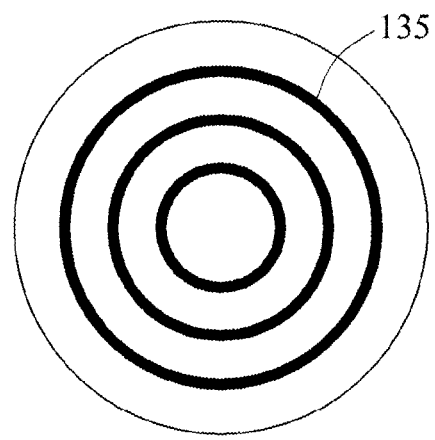

Referring to FIG. 7C, the photodiodes 135 are disposed along concentric circles to form a circular formation. When the photodiodes 135 are disposed along the concentric circles as illustrated in FIG. 7C, a position and a depth of a target object with respect to a vertical direction of a center of the concentric circles may be accurately measured.

Figure 7D:
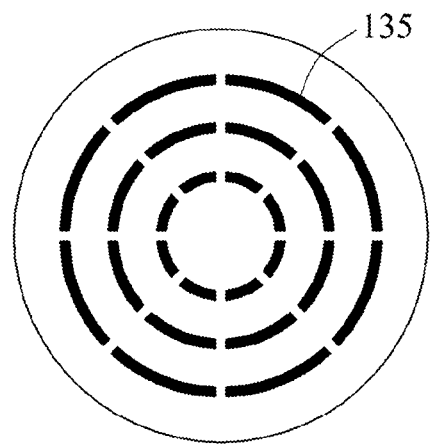

Referring to FIG. 7D, the photodiodes 135 are disposed along concentric circles to form a circular formation. When the photodiodes 135 are disposed along the concentric circles as illustrated in FIG. 7D, a reduced number of the photodiodes 135 may be required to form the circular formation. In addition, a detection area may be divided into areas and thus, a movement and a depth of a target object with respect to the areas may be measured.

FIG. 8 is a flowchart illustrating an example of an operating method of an electronic device to recognize a position of a target object.

Referring to FIG. 8, in operation 810, the electronic device 100 emits light to a detection area. The electronic device 100 may emit the light to the detection area through an optical source. The optical source may be disposed on the electronic device 100 to emit the light to the detection area. The optical source may be an infrared LED.

In operation 820, the electronic device 100 concentrates light reflected by the target object located in the detection area. The electronic device 100 may concentrate the reflected light through a light concentrator 120. The light concentrator 120 may include a condensing lens or a pinhole to concentrate the reflected light.

In operation 830, the electronic device 100 receives the reflected light concentrated by the light concentrator 120. The electronic device 100 may receive the reflected light through a light receiver 130 including photodiodes 135. The photodiodes 135 may be disposed at respective positions mapped to various incidence angles of the reflected light. The photodiodes 135 may be disposed along a concentric circle to form a circular formation. Alternatively, the photodiodes may be disposed along lines having a single intersection point.

In operation 840, the electronic device 100 determines the position of the target object based on a light quantity pattern of the reflected light output from the photodiodes 135. Additionally, the electronic device 100 may determine the position of the target object through a processor. The electronic device 100 may determine a distance between the light concentrator 120 and the target object based on an incidence angle of the reflected light. The electronic device 100 may determine the incidence angle of the reflected light based on mapping information between the photodiodes 135 and the corresponding incidence angle of the reflected light. When the reflected light is incident to the photodiodes 135, the electronic device 100 may determine, to be the incidence angle of the reflected light, an incidence angle mapped to a photodiode receiving a relatively large quantity of the reflected light among the photodiodes 135. The electronic device 100 may further determine the distance between the light concentrator 120 and the target object based on a distance between a first light concentrator 121 and a second light concentrator 122 included in the light concentrator 120.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
    an optical source configured to emit light to a detection area;
    a first lens or pinhole configured to concentrate first reflected light by a target object located in the detection area;
    a second lens or second pinhole configured to concentrate second reflected light by the target object;
    a first light receiver configured to receive through second group of photodiodes the first reflected light and to output a first light quantity pattern corresponding to the first reflected light;
    a second light receiver configured to receive, through a second group of photodiodes, the second reflected light and to output a second light quantity pattern corresponding to the second reflected light; and
    a processor configured to determine a position of the target object based on the first light quantity pattern and the second light quantity pattern, and to determine a distance between the electronic device and the target object based on an incidence angle of the first reflected light and the second reflected light on the respective lens or pinhole, the incidence angle of the first reflected light determined based on a number of the photodiodes in the first group, a size of the photodiodes in the first group, a spacing between the photodiodes in the first group, and a form of the first lens or pinhole.

2. The electronic device of claim 1, wherein the processor is further configured to determine the position of the target object with respect to the electronic device based on a position of a first photodiode in the first group having a maximum quantity of light detected compared to other photodiodes in the first group and a position of a second photodiode in the second group having a maximum quantity of light detected compared to other photodiodes in the second group.

3. The electronic device of claim 1, wherein the processor is further configured to determine, to be the incidence angle of the first reflected light, an incidence angle mapped to a photodiode receiving a maximum quantity of the first reflected light among the photodiodes in the first group.

4. The electronic device of claim 1, wherein the processor is further configured to determine a distance between the electronic device and the target object based on the incidence angle of the first reflected light, the incidence angle of the second reflected light, and a distance between the first lens or pinhole and the second lens or pinhole.

5. The electronic device of claim 1, wherein the processor is further configured to determine, to be a distance between the electronic device and the target object, a height of a triangle having a distance between the first lens or pinhole and the second lens or pinhole as a base line, the incidence angle of the first reflected light as an exterior angle of the base line, and the incidence angle of the second reflected light as an interior angle of the base line.

6. The electronic device of claim 1, wherein the processor is further configured to determine the position of the target object based on first mapping information comprising identification information of photodiodes comprised in the first light receiver and corresponding incidence angles of the first reflected light and second mapping information comprising identification information of photodiodes comprised in the second light receiver and corresponding incidence angels of the second reflected light.

7. The electronic device of claim 1, wherein the processor is further configured to determine the incidence angle of the first reflected light on the first lens or pinhole based on a linearly increasing relationship between successive photodiodes in the first group and corresponding incidence angles.

8. An operating method of an electronic device, comprising:
    emitting light to a detection area;
    concentrating first reflected light and second reflected light by a target object located in the detection area;
    receiving through a first group of photodiodes the first reflected light and outputting a first light quantity pattern corresponding to the first reflected light;
    receiving, through a second group of photodiodes, the second reflected light and outputting a second light quantity pattern corresponding to the second reflected light;
    determining a position of the target object based on the first light quantity pattern and the second light quantity pattern; and
    determining a distance between the electronic device and the target object based on an incidence angle of the first reflected light and the second reflected light on the respective lens or pinhole; and
    determining the incidence angle of the first reflected light based on a number of the photodiodes in the first group, a size of the photodiodes in the first group, a spacing between the photodiodes in the first group, and a form of the first lens or pinhole.

9. The method of claim 8, wherein the determining of the distance between the electronic device and the target object comprises determining, to be the incidence angle of the first reflected light on the first lens or pinhole, and incidence angle mapped to a photodiode in the first group receiving a maximum quantity of the reflected light among the photodiodes in the first group.

10. The method of claim 8, wherein the determining of the position of the target object further comprises determining the distance between the electronic device and the target object based on a distance between the first lens or pinhole and the second lens or pinhole.

11. A position measuring sensor, comprising:
a first lens or pinhole configured to concentrate first reflected light by a target object located in a detection area;
a second lens or second pinhole configured to concentrate second reflected light by the target object;
a first light receiver configured to receive the first reflected light from the first lens or pinhole through a first group of photodiodes; and a second light receiver configured to receive the second reflected light from the second lens or pinhole through a second group of photodiodes,
wherein a position of the target is determined based on the first light quantity patter and the second light quantity pattern and based on an incidence angle of the first reflected light and the second reflected light on the respective lens or pinhole, the incidence angle of the first reflected light determined based on a number of the photodiodes in the first group, a size of the photodiodes in the first group, a spacing between the photodiodes in the first group, and a form of the first lens or pinhole.

12. The position measuring sensor of claim 11, wherein the first group of photodiodes are disposed at respective positions mapped to various incidence angles of the first reflected light with respect to the first lens or pinhole.

13. The position measuring sensor of claim 11, wherein the first group of photodiodes are disposed along concentric circles to form a circular formation, wherein a first photodiode comprises an outer edge with a first distance to a center of the concentric circles, a second photodiode comprises an outer edge with a second distance to the center of the concentric circles, and a third photodiode comprises an outer edge with a third distance to the center of the concentric circles, and wherein one of the first distance, the second distance, and the third distance differs from one another.

14. The position measuring sensor of claim 11, wherein the first group of photodiodes are disposed along lines having a single intersection point.

15. An electronic device comprising:
an optical source configured to emit light to a detection area;
a first light receiver configured to receive, through a first group of photodiodes first reflected, first reflected light from a target object located in the detection area and to output a first light quantity pattern corresponding to the reflected light;
a second light receiver configured to receive through a second group of photodiodes second reflected light from the target object and to output a second light quantity pattern corresponding to the second reflected light; and
a processor configured to determine a position of the target object based on the first light quantity and the second light quantity pattern, and to determine a distance between the electronic device and the target object based on an incidence angle of the first reflected light and the second reflected light on the respective lens or pinhole, the incidence angle of the first reflected light determined based on a number of the photodiodes in the first group, a size of the photodiodes in the first group, a spacing between the photodiodes in the first group, and a form of the first lens or pinhole.

16. The electronic device of claim 15 further comprising:
a first lens or pinhole configured to receive the first reflected light from the target object located and to concentrate the first reflected light and to provide the first reflected light to the first light receiver; and
a second lens or pinhole configured to receive the second reflected light from the target object and to concentrate the second reflected light and to provide the second reflected light to the second light receiver.

* * * * *